July 3, 1951 R. FOUQUET 2,558,744
PRODUCTION OF LIQUID MAGNESIUM
Original Filed July 22, 1947
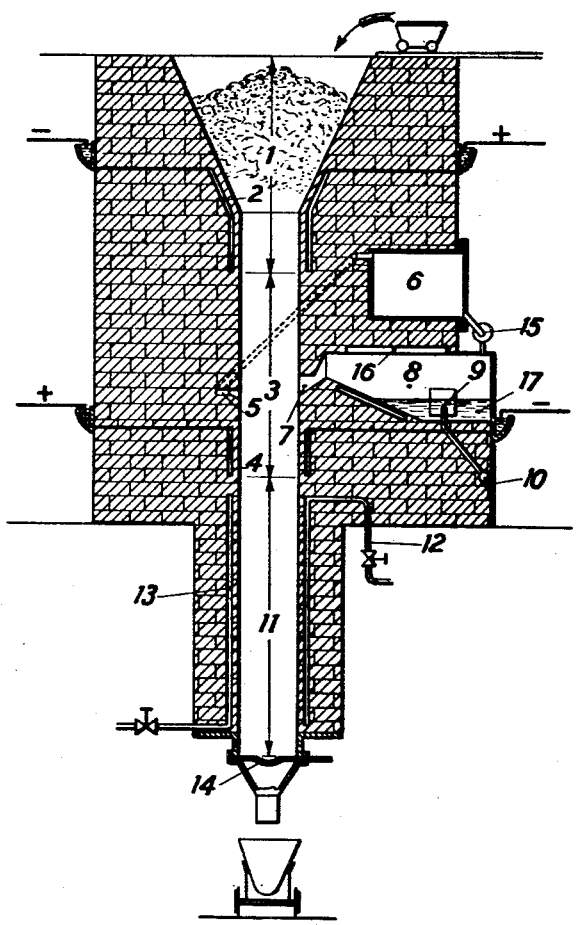
Inventor:
Robert Fouquet.

Patented July 3, 1951

2,558,744

UNITED STATES PATENT OFFICE 2,558,744

PRODUCTION OF LIQUID MAGNESIUM

Robert Fouquet, Paris, France

Original application July 22, 1947, Serial No. 762,755. Divided and this application February 27, 1948, Serial No. 11,592. In France December 28, 1942

Section 1, Public Law 690, August 8, 1946
Patent expires December 28, 1962

3 Claims. (Cl. 75—67)

This invention relates to the production of magnesium in the liquid state.

It is known that at a suitable temperature magnesia can be reduced to metallic form by solid non-carbonaceous reducers yielding solid oxidation products, such as the silicon of a ferrosilicon; the magnesia may consist of a dolomite previously freed from carbon dioxide.

It is known likewise that this reduction is produced by contact action between the solids involved in the reaction, and that it furnishes metallic magnesium of which the physical state depends upon the temperature and pressure, for example in the reaction vessel or in a communicating space to which the magnesium is passed. It is known, finally, that magnesium is a metal extremely easy to oxidize, especially when the temperature rises considerably above the ordinary temperature.

The present invention has for its main object to provide an improved method of the kind above set forth, that is, employing solid non-carbonaceous reducers yielding solid oxidation products, for production of magnesium in the necessary conditions for obtaining magnesium in the liquid state, and with a continuous operation.

Other objects and advantages of the invention will hereinafter appear from the following description given with reference to the accompanying drawing, which shows by way of example an apparatus for carrying out the invention.

The furnace illustrated is constituted mainly by a vertical chamber 1, 3, 11, of elongated form, slightly widened out at the upper part, and having a fluid-tight lining of brickwork refractory at high temperatures. This chamber, although continuous, can be considered as composed of three superposed sections opening into one another. The upper section 1, widened out upwards, receives the mixture of magnesia or dolomite in very fine dust form and fine powdered ferrosilicon or other suitable reducer, such as aluminium, ferro-silicon-aluminium, calcium carbide or the like. These powders are of different fineness; for the magnesia or dolomite, the fineness may range from 1 to $10\mu$, particles of a size less than $10\mu$ being herein defined as "very fine," while for the reducer it may range from 100 to $1000\mu$ approximately, particles of a size less than $1000\mu$ being herein defined as "fine," and the mixture of the powders is very thorough. The magnesia can be in the free state, or be engaged in a carbonated combination in the form of globertite or dolomite, which constitute the natural raw materials of magnesia. It is advantageous that it be dry.

At the base of the widened upper section 1, an electrical heating means 2, of which mention will be made later on, allows of developing a temperature of the order of 1000° C. sufficient in general for ensuring a complete degassing of the reducible material and its total drying, if necessary. The gases arising from the removal of carbon dioxide and moisture may escape naturally from the open top portion of this first section or may be collected by a storage installation analogous to that of a blast furnace with recovery of the furnace gases.

A second section 3 of constant sectional area follows the upper section 1; at its lower part, it comprises an electrical heating means 4 which allows of developing a temperature of the order of 1350 to 1400° C., which brings about the reducing reaction, with consequent production of the metal magnesium in the form of vapor. Slightly above the heating means 4, there opens over a portion of the circumference of the section 3 a series of orifices 5, in connection with a hydrogen or argon reservoir 6 in which there exists a pressure slightly greater than the external atmospheric pressure; a little higher still, over another portion of the circumference of the section 3 there opens out an orifice 7 in free communication with a lateral condensation chamber 8. This chamber is elongated in the horizontal direction, and into it there will circulate the metallic vapor and gas drawn out from the section 2 by maintaining in the chamber 8 a pressure slightly lower than that of the reservoir 6 serving for the admission of the gas, but still higher than the external atmospheric pressure. This lateral chamber 8 is maintained by a heating device 16 at a constant temperature of approximately 750° C., and in this chamber there is effected the condensation of the magnesium vapor in liquid form by reason of the temperature and pressure existing therein. By siphon discharge at 9, the liquid metal is evacuated to the exterior through a pouring hole 10 without the external atmosphere being at any moment in contact with the interior of the lateral condensation chamber 8.

Lastly, a third section 11, of very slightly decreasing sectional area, forms a continuation of the second section 3, below the high temperature zone near the heating means 4. This third section 11 comprises means for recovery of heat from the descending materials which are cooled gradually as they travel towards the lower part of this section. The heat recovery means may comprise a water circulation system 12, with the water passing through a metallic cooling jacket 13. At its lower part, the section 11 is closed by a disc-type distributor 14 which is rotated to allow the discharge of the cold spent material from the furnace.

The various heating means of the first and second sections 1, 3 and of the lateral condensation chamber 8, may consist of a metallic bath heated by electrical resistance to the required temperature, circulating in flues made of porcelain which are impermeable to the bath, nonconductive and highly refractory; the metal bath may, for example, be found of molten tin, which at the temperatures contemplated has a low vapor tension, does not deteriorate and is not toxic. The heating arrangement may alternatively consist of a series of thin graphite plates heated by an electrical resistance. Heating may also be provided by the combustion of gas in chambers surrounding the central chamber, or by other suitable means.

Under these conditions, the mixed pulverulent materials descend by gravity in their travel through the furnace. At the height of the first heating stage, at a temperature of about 1000° C., the mixture loses not only carbon dioxide, but also entrained air, and air adsorbed by the solid particles of the mixture. This degassing is favored by the movement of the particles.

The mass thus freed from gas reaches the region of the second section 3, where it traverses the current of hydrogen or argon circulating transversely between the reservoir 6 and the lateral condensation chamber 8. The vertical distance separating the line of circulation of this current from the base of the first chamber is very great in comparison with the horizontal distance between the orifices 5 for arrival of the current and the orifice 7 for its entry into the condensation chamber 8. Moreover, as is known, pulverulent material of the degrees of fineness practised here opposes to the circulation of a gas very considerable losses of head. This circulation is governed not even by the laws of Poiseuille's regime of capillary orifices, but by still stricter conditions, the material being in movement downwards and therefore self-packing into close contact of the particles. Consequently, by determining in a suitable manner, the vertical distance between the line followed by the gaseous current transversely and the base of the first section 1, there will be practically no loss of gas in the upward direction.

The same determination between the extreme base of the third section 11 and the same transverse line of the circulation of the gaseous current, allows of avoiding any entrainment of hydrogen downwards, as well as any ascent of air coming from the bottom of the furnace.

In the second section 3, the materials are raised to a temperature approximating to 1350° C., and the reaction takes place by contact action. The very fine particles of magnesia, being much smaller than the "fine" particles of the reducer, becomes agglomerated with the latter and the yield of the reaction is normal; at this temperature and pressure magnesium exists only in the gaseous state.

It is to be remarked that the metallic vapors are entrained into the lateral condensation chamber 8, under a double influence: (1) the temperature maintained in the vicinity of 750° C. causes a draft by thermal contraction; (2) the gaseous current of hydrogen or argon, main-tained by means of a fan 15 established in the gaseous circuit, adds its action to the foregoing. Thus all the gases, being prevented from escaping vertically either upwards through the plug formed by the descending and closely packed pulverulent materials, or downwards by an obstacle of like nature formed of the spent reaction materials, and following the draft into the condensation chamber 8, is entrained into the latter. The hydrogen or argon continues its circulation through the fan 15 back to the reservoir 6. The temperature and pressure conditions in chamber 8 are such that the magnesium vapor is condensed to the liquid phase; the molten metal collects in the basin formed on the floor 17 of chamber 8. The molten magnesium is recovered from chamber 8 by siphon 9 leading to pour orifice 10.

Finally, the spent pulverulent materials continue their travel in the bottom or third section 11 of the tower, where they are cooled by water cooling means 13 and finally arrive at the outlet distributor 14 through which they are removed in any convenient manner.

The sectional areas of the various sections of the chamber 1, 3, 11 depend upon two factors: (a) mass to be treated; (b) rate of descent. The latter is regulated solely by the angular speed of the outlet distributor 14.

The shape of these sectional areas can be circular or oval. Account is taken in the details of their construction of the fact that pulverulent material is in general a very bad conductor of heat, and that the heat is transmitted at a suitable speed only over distances of from 15 to 20 cm. starting from the source of heat. The shape and the dimensions of these sectional areas is determined by the preceding distance of 15 to 20 cm. at a maximum and also by the speed of descent of the charges.

Thus the furnace described provides for the securing of liquid magnesium in a continuous single operation. It will be observed that there is in this furnace no apparatus for production of vacuum, that the continuous operation avoids the troublesome effects of variations of temperatures upon the refractory furnace linings, that the advance of the materials is produced solely by gravity, that it is possible to recover a large part of the heat provided for the operation, that the bringing to temperature of the reaction masses is caused by a liquid metallic bath (tin) without practical loss either of metal or of energy, the contacts being always perfect between the lead-in conductors and the baths, and that in this way there is realized probably for the first time the production in continuous manner of liquid magnesium, without the use of vacuum.

The apparatus described in the present specification and illustrated in the accompanying drawings forms the subject of U. S. application Ser. No. 762,755, filed July 22, 1947, now abandoned, of which this application is a division.

What I claim is:

1. In a method of producing magnesium by the thermal reduction of magnesium ores by non gas-forming solid reducing agents, the steps of forming a finely divided particulate intimate mixture of said ore and reducing agent, introducing said mixture into a vertical elongated reaction chamber comprising three superimposed vertical zones, heating said mixture to degas and dry it and simultaneously feeding the same by gravity to form a self-packed substantially gas impervious enclosed column of said mixture in the first zone, allowing said gas impervious column to descend by gravity from said first zone into a reduction zone, reducing the ore in said reduction zone by heating to reaction temperature to vaporize the resulting magnesium, withdrawing the magnesium vapors from said reduction zone substantially laterally into a condensation chamber, allowing the spent solid reaction materials to form by gravity a self-packed gas-impervious enclosed column in the third zone beneath said reduction zone, said columns of raw and spent materials in said first and third zones being substantially continuous and having a length sufficient to render them substantially impervious to the passage of gases vertically therealong, whereby the ingress of air through said columns into said reduction zone is prevented.

2. In a method of producing magnesium by the thermal reduction of magnesium ores by non gas-forming solid reducing agents, as claimed in claim 1, introducing an inert gas laterally into the reduction zone and withdrawing said inert gas together with the magnesium vapors laterally into the condensation chamber.

3. In a method of producing magnesium by the thermal reduction of magnesium ores by non gas-forming solid reducing agents, the steps of pulverizing said ore to a fineness of within the range of from 1 to 10 microns, pulverizing said reducing agent to a degree of fineness of between 100 to 1000 microns, intimately mixing said pulverized ore and pulverized reducing agent, feeding said mixture by gravity to form a self-packed substantially gas-impervious enclosed column of said mixture, and simultaneously with said feeding, heating said mixture to a temperature of about 1000° C. whereby said mixture is degassed and dried, continuously passing said degassed and dried mixture to a contiguous reduction zone, heating said mixture in said reduction zone to a temperature of from about 1350° to 1400° C., whereby said ore is reduced to form magnesium vapor, withdrawing the magnesium vapor from said reduction zone substantially laterally and condensing said vapor in a condensation chamber at a temperature of about 750° C., allowing the spent solid reaction products to form by gravity a self-packed substantially gas impervious enclosed column beneath said reduction zone, and continuously discharging said spent materials from the base of said second column at a controlled rate co-related with the rate of feed of the raw materials to form the first column and the rate of the reduction reaction, whereby a continuous method of forming magnesium is effected, each of said columns of raw and spent materials having a height sufficient to render them substantially impervious to the passage of gases vertically therealong, whereby the ingress of air through said columns into said reduction zone is prevented.

ROBERT FOUQUET.

REFERENCES CITED

The following references are of record in the file of this patent:

UNITED STATES PATENTS

| Number | Name | Date |
| --- | --- | --- |
| 2,011,288 | Kemmer | Aug. 13, 1935 |
| 2,123,990 | Erdman | July 19, 1938 |
| 2,219,059 | Suchy et al. | Oct. 22, 1940 |
| 2,224,160 | Peake et al. | Dec. 10, 1940 |
| 2,337,042 | Gloss | Dec. 21, 1943 |
| 2,362,718 | Pidgeon | Nov. 14, 1944 |
| 2,402,193 | Willmore | June 18, 1946 |

FOREIGN PATENTS

| Number | Country | Date |
| --- | --- | --- |
| 543,399 | Great Britain | Feb. 24, 1942 |